(12) United States Patent
Gottschlich et al.

(10) Patent No.: US 9,697,040 B2
(45) Date of Patent: Jul. 4, 2017

(54) SOFTWARE REPLAYER FOR TRANSACTIONAL MEMORY PROGRAMS

(71) Applicant: Intel Corporation, Santa Clara, CA (US)

(72) Inventors: Justin E. Gottschlich, Santa Clara, CA (US); Gilles A. Pokam, Fremont, CA (US); Shiliang Hu, Los Altos, CA (US); Rolf Kassa, Braunschweig (DE); Youfeng Wu, Palo Alto, CA (US); Irina Calciu, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 68 days.

(21) Appl. No.: 14/226,312

(22) Filed: Mar. 26, 2014

(65) Prior Publication Data

US 2015/0277968 A1    Oct. 1, 2015

(51) Int. Cl.
*G06F 9/44* (2006.01)
*G06F 9/45* (2006.01)
*G06F 9/46* (2006.01)
*G06F 11/34* (2006.01)
*G06F 11/36* (2006.01)

(52) U.S. Cl.
CPC .............. *G06F 9/467* (2013.01); *G06F 11/34* (2013.01); *G06F 11/3648* (2013.01); *G06F 11/362* (2013.01)

(58) Field of Classification Search
CPC ................ G06F 9/45504; G06F 9/467; G06F 11/362–11/3664; G06F 11/34; G06F 11/3648
See application file for complete search history.

(56) References Cited

U.S. PATENT DOCUMENTS

| | | | |
|---|---|---|---|
| 7,849,446 B2 * | 12/2010 | Lev | G06F 11/3632 717/124 |
| 8,180,967 B2 * | 5/2012 | Rajwar | G06F 9/30087 711/135 |
| 8,453,120 B2 * | 5/2013 | Ceze | G06F 9/467 714/36 |
| 8,533,681 B2 * | 9/2013 | Zhou | G06F 11/3612 717/126 |
| 8,688,920 B2 * | 4/2014 | Heller, Jr. | G06F 9/45504 707/703 |

(Continued)

OTHER PUBLICATIONS

Chi Cao Minh, An Effective Hybrid Transactional Memory System with Strong Isolation Guarantees, 2007, pp. 1-12.*

(Continued)

*Primary Examiner* — Thuy Dao
*Assistant Examiner* — Mongbao Nguyen
(74) *Attorney, Agent, or Firm* — Trop, Pruner & Hu, P.C.

(57) ABSTRACT

A system is disclosed that includes a processor and a dynamic random access memory (DRAM). The processor includes a hybrid transactional memory (HyTM) that includes hardware transactional memory (HTM), and a program debugger to replay a program that includes an HTM instruction and that has been executed has been executed using the HyTM. The program debugger includes a software emulator that is to replay the HTM instruction by emulation of the HTM. Other embodiments are disclosed and claimed.

19 Claims, 5 Drawing Sheets

(56) References Cited

U.S. PATENT DOCUMENTS

| | | | | |
|---|---|---|---|---|
| 8,972,794 B2* | 3/2015 | Wilding | ............... | G06F 11/366 |
| | | | | 714/45 |
| 9,128,781 B2* | 9/2015 | Kranich | ............... | G06F 9/526 |
| 2002/0010882 A1* | 1/2002 | Yamashita | ........... | G06F 11/3636 |
| | | | | 714/45 |
| 2007/0288900 A1* | 12/2007 | Lev | ................ | G06F 11/3632 |
| | | | | 717/124 |
| 2007/0288902 A1* | 12/2007 | Lev | ................ | G06F 11/3632 |
| | | | | 717/124 |
| 2008/0288238 A1* | 11/2008 | Heller, Jr. | ........... | G06F 9/45504 |
| | | | | 703/28 |
| 2008/0320334 A1 | 12/2008 | Taillefer | | |
| 2009/0006750 A1 | 1/2009 | Taillefer et al. | | |
| 2009/0007107 A1* | 1/2009 | Taillefer | .............. | G06F 9/45533 |
| | | | | 718/1 |
| 2009/0044175 A1* | 2/2009 | Sekiguchi | ........... | G06F 11/3648 |
| | | | | 717/127 |
| 2009/0171962 A1* | 7/2009 | Goodman | ............... | G06F 9/467 |
| 2009/0217104 A1* | 8/2009 | Wilding | ............... | G06F 11/366 |
| | | | | 714/45 |
| 2009/0254739 A1* | 10/2009 | Takada | ................ | G06F 11/3648 |
| | | | | 712/227 |
| 2010/0153953 A1* | 6/2010 | Adl-Tabatabai | ......... | G06F 9/528 |
| | | | | 718/101 |
| 2010/0332808 A1* | 12/2010 | Adl-Tabatabai | ...... | G06F 9/3004 |
| | | | | 712/225 |
| 2011/0119452 A1 | 5/2011 | Heller, Jr. | | |
| 2011/0145637 A1* | 6/2011 | Gray | ................ | G06F 11/141 |
| | | | | 714/15 |
| 2011/0258613 A1 | 10/2011 | Bhogal | | |
| 2012/0179877 A1* | 7/2012 | Shriraman | ............. | G06F 9/524 |
| | | | | 711/141 |
| 2013/0055022 A1* | 2/2013 | Chong | ................ | G06F 11/3656 |
| | | | | 714/28 |
| 2013/0339673 A1* | 12/2013 | Belmar | ............... | G06F 9/30087 |
| | | | | 712/220 |
| 2014/0007054 A1 | 1/2014 | Wu et al. | | |
| 2014/0089642 A1 | 3/2014 | Gottschlich et al. | | |
| 2014/0096132 A1 | 4/2014 | Wang et al. | | |
| 2014/0115604 A1 | 4/2014 | Gottschlich et al. | | |
| 2014/0181821 A1* | 6/2014 | Shavit | ............... | G06F 9/466 |
| | | | | 718/101 |
| 2014/0189256 A1 | 7/2014 | Kranich et al. | | |
| 2014/0281705 A1* | 9/2014 | Dautenhahn | ........ | G06F 11/1484 |
| | | | | 714/16 |
| 2015/0026688 A1* | 1/2015 | Dice | ................ | G06F 9/467 |
| | | | | 718/102 |
| 2015/0052315 A1* | 2/2015 | Ghai | ................ | G06F 9/467 |
| | | | | 711/145 |
| 2015/0089155 A1* | 3/2015 | Busaba | ............... | G06F 12/0815 |
| | | | | 711/141 |
| 2015/0100741 A1 | 4/2015 | Calciu et al. | | |
| 2015/0169357 A1* | 6/2015 | Busaba | ................ | G06F 9/467 |
| | | | | 711/150 |
| 2015/0186178 A1* | 7/2015 | Kassa | .................... | G06F 9/528 |
| | | | | 718/101 |
| 2015/0277968 A1 | 10/2015 | Gottschlich et al. | | |
| 2016/0179569 A1* | 6/2016 | Gottschlich | ............ | G06F 9/467 |
| | | | | 711/147 |

OTHER PUBLICATIONS

Yossi Lev, Debugging and Profiling of Transactional Programs, 2010, pp. 11-64.*
Satish Narayanasamy, BugNet: Continuously Recording Program Execution for Deterministic Replay Debugging, 2005, pp. 1-12.*
Annette Bieniusa, Consistency, Isolation, and Irrevocability in Software Transactional Memory, 2011.*
Gilles Pokam, CoreRacer: A Practical Memory Race Recorder for Multicore x86 TSO Processors, 2011, pp. 1-10.*
Collin Blundell, RETCON: Transactional Repair without Replay, 2010, pp. 1-12.*
Peng Wang, Towards the Multithreaded Deterministic Replay in Program Debugging, 2012, pp. 1-6.*
International Searching Authority, "Notification of Transmittal of the International Search Report and the Written Opinion of the International Searching Authority," mailed Jun. 23, 2015, in International application No. PCT/US2015/021929.
Gottschlich, et al., "But How Do We Really Debug Transactional Memory Programs?" USENIX HotPar, Intel Labs, San Jose, CA, Jun. 2013, 7 pages.
Minh, et al., "An Effective Hybrid Transactional Memory System with Strong Isolation Guarantees", ISCA'07, Jun. 9-13, 2007, Copyright 2007 ACM 978-1-59593-706-3/07/0006, 12 pages, Computer Systems Laboratory, Stanford University, http://tcc.stanford.edu.
Peter Bright, "IBM's new transactional memory: make-or-break time for multithreaded revolution", http://arstechnica.com/gadgets/2011/08/ibmsnewtransactionalmemorymakeorbreaktimeformultithreadedrevolution/, Aug. 31, 2011, 5 pages.
Pokam, et al., "QuickRec: Prototyping an Intel Architecture Extension for Record and Replay of Multithreaded Programs", ISCA'13, Copyright 2013 ACM 978-1-4503-2079-5/13/06, 12 pages, Tel Aviv, Israel.
Peter Bright, "Transactional memory going mainstream with Intel Haswell", http://arstechnica.com/ business/2012/02/ transactionalmemorygoingmainstreamwithintelhaswell/, Feb. 8, 2012, 4 pages.
Korea Intellectual Property Office, Notice of Rejection mailed Mar. 21, 2017, in Korean Patent Application No. 10-2016-7023067.

* cited by examiner

SOFTWARE REPLAYER FOR TRANSACTIONAL MEMORY PROGRAMS

TECHNICAL FIELD

Embodiments pertain to transactional memory.

BACKGROUND

Hardware transactional memory (HTM) systems may be available for wide scale adoption in the near future. HTM systems, combined with tested and stable software transactional memory systems, may be a more attractive alternative than lock-based parallel programming, in terms of programmability and performance.

Hybrid transactional memory (TM) systems ("HyTM") are systems that employ both HTM and software transactional memory (STM). Traditional debugging techniques, such as breakpoints and ad hoc I/O debugging, do not apply to HyTMs because traditional debugging techniques can cause hardware transactions to abort when the debugging techniques use certain instructions (e.g., interrupts, I/O, context switches, etc.) that are illegal for hardware transactions. Hence, a question that arises with HyTM systems is how to debug a transactional memory program that executes some hardware transactions.

DETAILED DESCRIPTION

A record-and-replay (RnR) system is presented herein that includes an RnR software replayer. The RnR system may provide debugging support for a HyTM system (also "HyTM" herein) that uses HTM. In the record-and-replay system (RnR system) presented herein, a transactional memory (TM) program is executed and recorded by a hardware system, and is then replayed by a software system that uses a combination of emulation of underlying hardware and implementation of software portions of the HyTM system.

Using hardware-based recording, the RnR system presented herein leaves intact a contention signature of the TM program, allowing correctness TM bugs (e.g., programming errors) and performance TM bugs (e.g., efficiency-related issues) to be recorded. Using software-based replay, a recorded TM program can be replayed using a combination of the STM and an emulation of the HTM, so as to provide a useful correctness and performance debugging analysis.

An RnR transactional debugger (TDB) system presented herein may precisely record and replay TM programs with negligible perturbation to execution of the TM program. The methods and apparatus presented herein do not alter the contention signature of a buggy TM program. The RnR TDB system may capture an exact location and cause of transactional aborts, which may enable a programmer to analyze a TM program to determine a cause of execution failure.

Figure 1:
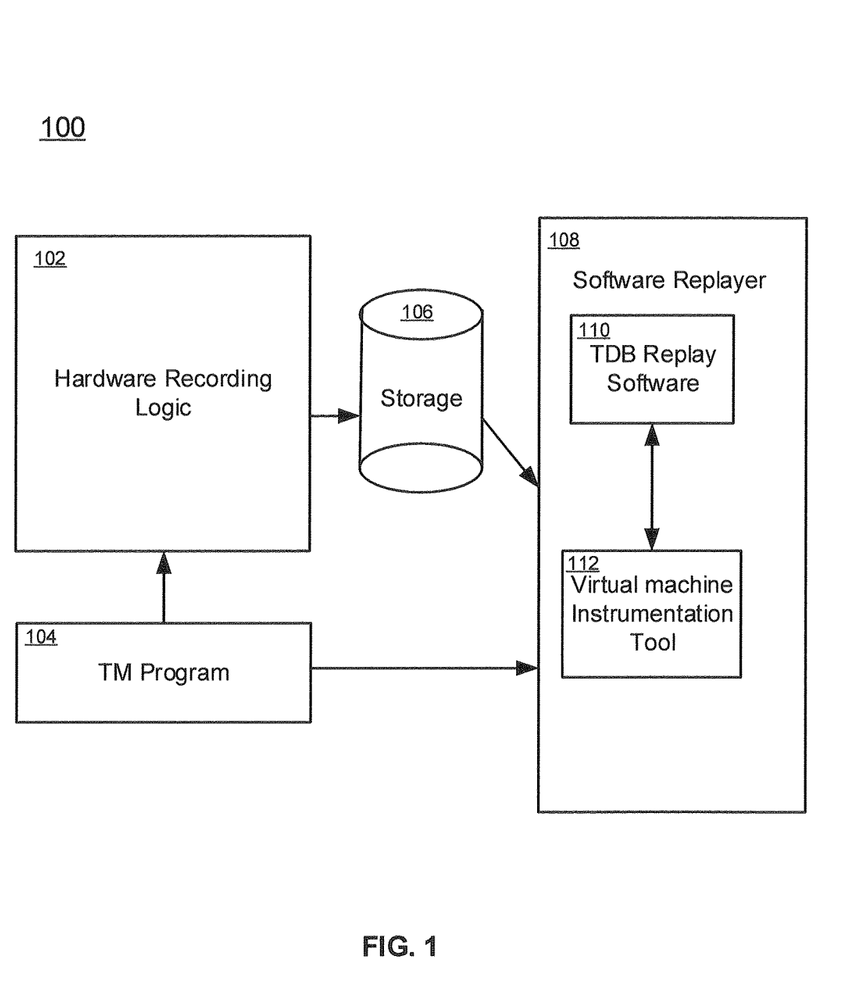
FIG. 1 is a block diagram of a record and replay (RnR) system, according to embodiments of the present invention.

FIG. 1 is a block diagram of an RnR system 100, according to embodiments of the present invention. The system 100 includes hardware recording logic 102, storage 106, and a software replayer 108 that includes software transactional debugger (TDB) replay software 110 and a virtual machine instrumentation tool 112.

In operation, the (hardware) recording logic 102 may record events that occur during execution of a TM program 104. Events may include, but are not limited to, transaction-start, transaction-end, and transaction-abort. The events may be recorded in the storage 106 as recorded log files.

The software replayer 108 may be configured to emulate the recording logic 102 including hardware transactional memory (HTM) used in program recording. The virtual machine instrumentation tool 112 may be configured to instrument and replay application binary code. The software replayer 108 may replay the TD program 104 and analyze results, e.g., identify correctness errors and performance errors.

TM systems typically do not support full escape actions, and therefore instructions executed within the context of a hardware transaction can become part of that hardware transaction's execution. If the replayer 108 were to use the hardware recording logic 102 (e.g., including HTM), then all management operations to coordinate ordering of program threads would appear within a hardware transaction and would result in an alteration of the original recorded program's behavior. That is, the hardware transactions would include additional instructions that would likely change an execution behavior of the hardware transactions.

Additionally, even if escape actions were supported, some operations, such as context switches and input/output (I/O) operations, might still be illegal for hardware transactions. If such illegal operations were performed within a hardware transaction, the hardware transaction could immediately abort. Context switching, interrupts, and I/O commands are operations that may be considered in replaying a recorded program. For example, shared memory inter-leavings between threads are typically managed in a replayer by stalling execution of one thread to resume execution of another thread (e.g., context switching).

Transactional abort reproduction with precise error codes is included in the HTM emulation because such error codes may be used by a contention manager, resulting in different contention management behavior for each of the error codes.

Transactional commit reproduction may also be emulated for similar reasons as described above regarding transactional aborts. Software fallbacks are typically present for any best-effort HTM. Therefore, software fallbacks enable HTMs to make forward progress. Thus, to replay a recorded HTM-based program, the software transactional memory (STM) may be used to both record the program execution and to replay the recorded program. So long as the STM used in recording is used in replaying, the program can replay correctly.

Figure 2:
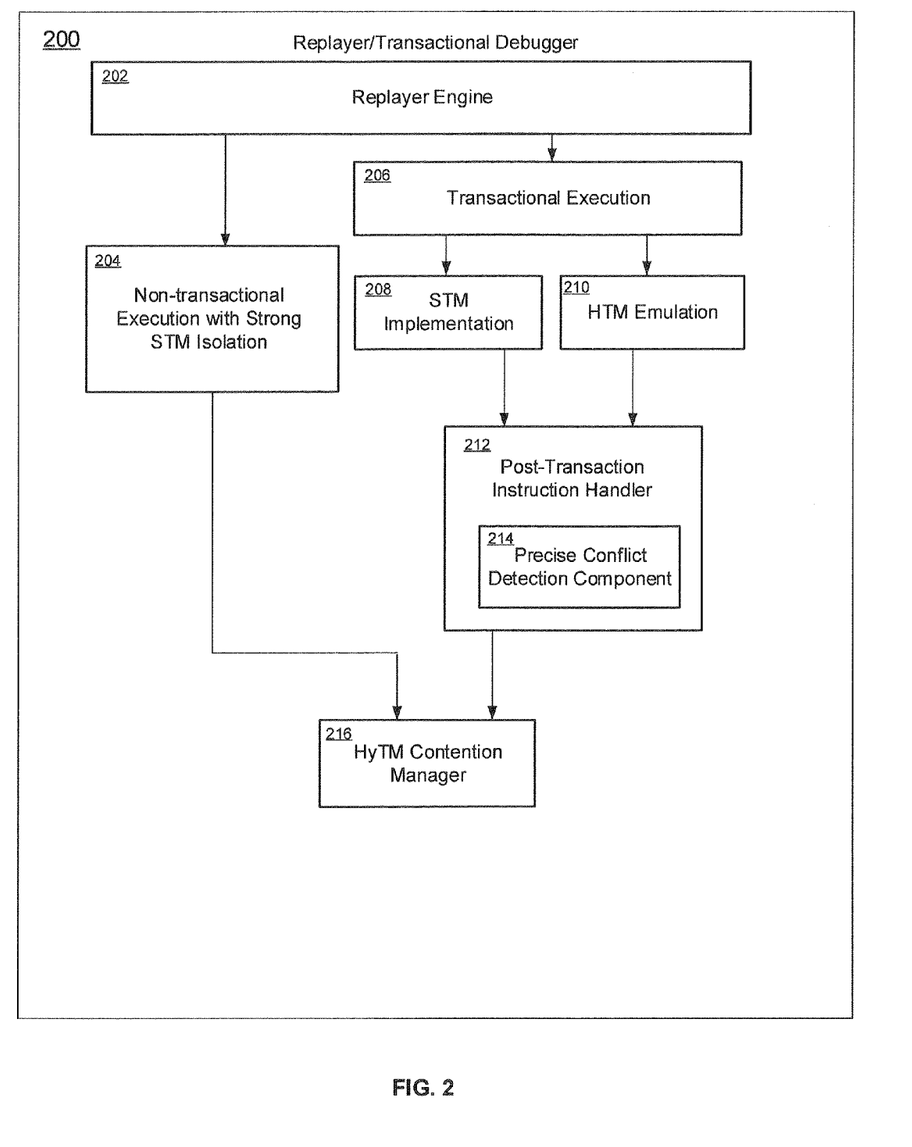
FIG. 2 is a block diagram of a replayer/transactional debugger, according to embodiments of the present invention.

FIG. 2 is a block diagram of a replayer/transactional debugger system 200, according to embodiments of the present invention. Components of the system 200 include a replayer engine 202, non-transactional execution 204, transactional execution 206, STM implementation 208, HTM emulation 210, a post transaction instruction handler 212, and a HyTM contention manager 216.

The (chunk based) replayer engine 202 replays a TM program and determines if each instruction is a transactional instruction or a non-transactional instruction. If an instruction is determined to be non-transactional, the instruction is replayed at 204 (e.g., normal execution). The non-transactional execution may be performed with strong STM isolation for correctness debugging. If the normal replay execution 204 detects an aborted instruction, the instruction may be sent to the HyTM contention manager 216.

If the instruction being replayed at the replayer engine 202 is a transactional instruction, the instruction is sent to transactional execution 206. If the instruction is a transactional instruction associated with a software transaction, the replay is performed using the STM (STM implementation) 208. If the transactional instruction is associated with a hardware transaction, the instruction is sent to HTM emulation 210. Post transaction instruction handler 212 can determine information about conflict(s) that have arisen, and includes a precise conflict detection component 212 to analyze conflicts and determine a cause of each conflict. If the instruction aborts or commits, the instruction may be sent to the hybrid transactional memory (HyTM) contention manager 216 for resolution.

The hybrid transactional memory contention manager (HyTM CM) 216 is to emulate a HyTM CM used in program recording so that the reproduction of commits and aborts is identical to a recorded program. If the HyTM CM is not replicated, then there is a possibility that the replayed program will not be identical in output to the recorded program. HyTM CM 216 decides which transactions are to be aborted and which transactions are to be committed, and when a hardware transaction or a software transaction should be re-executed upon transaction abort. If the HyTM CM 216 does not emulate the HyTM CM used in program recording, then a transaction abort and commit order can be violated, which may result in a potentially different final replayed state than was originally recorded.

For an HTM, the abort decision-making portion of contention management is automatically provided by underlying hardware. Therefore, the abort decision-making of HTM instructions is handled by HTM emulation 206. The remaining HyTM CM portions may be implemented in software and may be outside of the scope of the STM implementation 208, depending on whether the HyTM CM 216 supports dynamic contention management strategies, in which case an STM contention manager may be found in an auxiliary library. For at least this reason, HyTM CM 216 is shown as a separate component from STM implementation 208.

The replayer engine 202 replays instructions within a chunk of instructions, the chunk defined by a recognizable beginning marker and a recognizable end marker. For example, a chunk may begin at a start of a transaction and may end at an end of the transaction, or when a conflict arises, or when an unsupported instruction is discovered, etc. The replayer engine 202 is to replay instructions such that a causal ordering between shared memory accesses of concurrently executing threads is preserved in replay, and includes all types of shared memory synchronization mechanisms, including acquiring and releasing locks, executing atomic instructions, etc. In addition, the replayer engine 202 is to correctly replay nondeterministic input system events (OS-level) as they were recorded.

The replayer engine 202 may be chunk-based because of chunk-based recording. Without chunk-based replay, the recorded program would not replay correctly. The chunk-based replayer engine 202 may include a parser for recorded nondeterministic memory events, a parser for recorded nondeterministic input events, and an instruction-by-instruction replay engine. The replayer engine 202 may perform emulation of non-HTM instructions and also may replay macro-instruction atomicity violations.

The post-transaction instruction handler 212 includes a precise conflict detection component 214 for replayed transactions. Precise conflict detection between hardware and software transactions is to be implemented while retaining the program's transactional isolation semantics for hardware and software transactions as originally recorded. The precise conflict detection described here is used to track a source of transactional conflicts by the (chunk-based) replayer engine 202, and does not change semantics or behavior of the program as originally recorded.

Precise conflict detection may be implemented in the following example: assuming a software transaction is aborted by a hardware transaction, there may be a lack of precision in terms of identification of a conflict between the software transaction and the hardware transaction because the STM does not have direct knowledge of the hardware transaction that causes the software transaction to abort. By including precise conflict detection between software transactions and hardware transactions (e.g., only for conflict identification purposes), the system 200 can identify an exact location (within a program) of a conflict, which may improve quality of debugging, e.g., by eliminating false positives or guessed locations for memory conflicts that may otherwise occur.

Non-transactional replay execution 204 includes strong STM isolation. One of the properties achievable with the RnR system 200 is simulation of strong STM isolation for replayed software transactions. This is initially possible because of underlying RnR recording hardware, which can order interleaved shared memory accesses. During replay, shared memory interleavings can be used to identify correctness bugs between weakly isolated software transactions that access memory and that may be concurrently accessed outside of a transaction. Strong isolation does not change replayed behavior. Rather, strong isolation can identify when software transaction isolation is violated by a raw memory access.

Figure 3:
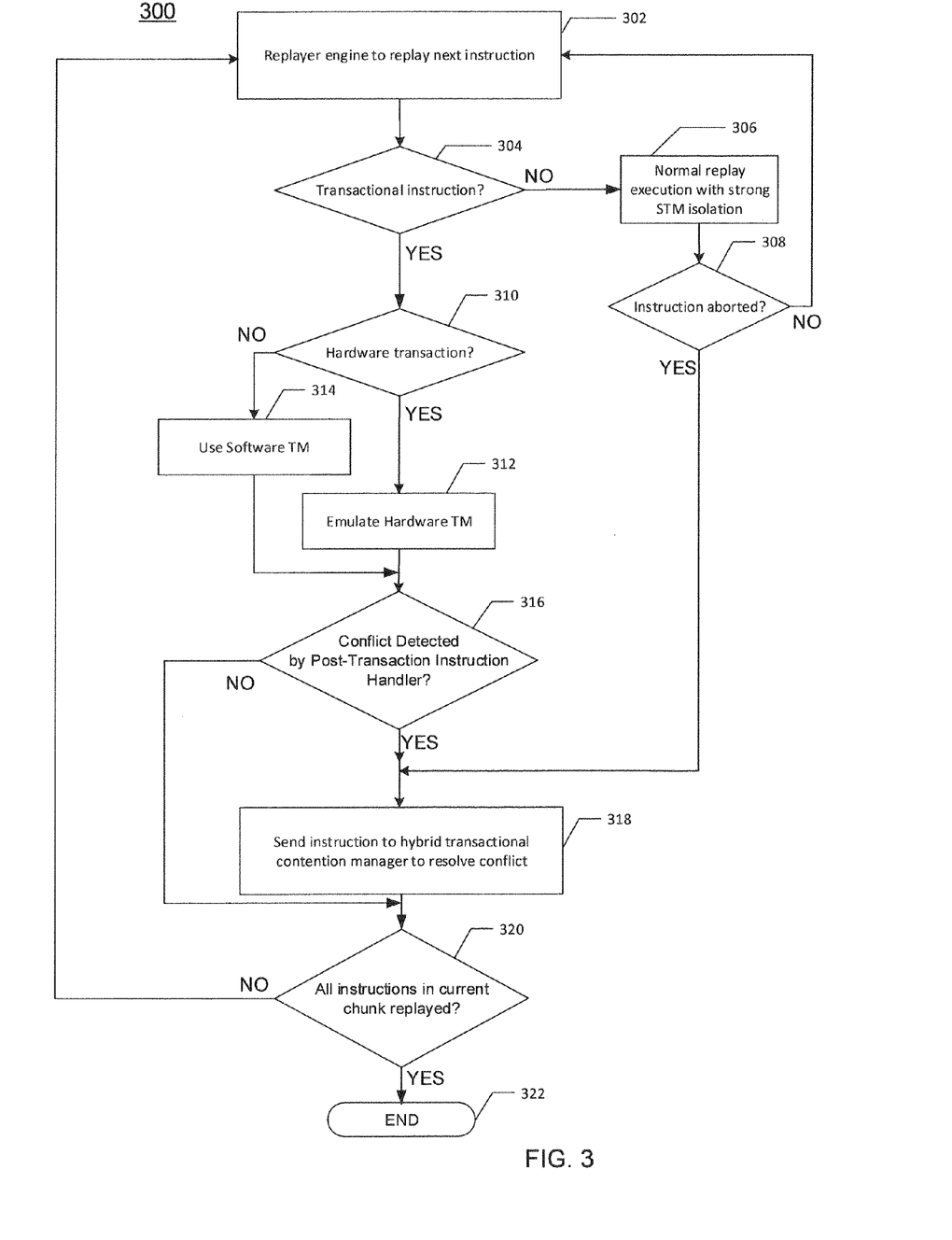
FIG. 3 is a flow diagram of a method to facilitate debugging of a transactional program, according to an embodiment of the present invention.

FIG. 3 is a flow diagram of a method 300 to facilitate debugging of a transactional program, according to an embodiment of the present invention. At block 302 a replayer engine is to replay a next instruction in a TM program. Continuing to decision diamond 304, if the instruction is not a transactional instruction, advancing to block 306 the instruction is treated as a normal (e.g., non-transactional) instruction and evaluated with strong STM isolation. Moving to decision diamond 308, if the instruction is not aborted, returning to block 302 the replayer engine replays the next instruction of the program. If the instruction is aborted, advancing to block 318 the instruction is sent to a hybrid transactional contention manager to resolve a conflict.

Returning to the decision diamond 304, if it is determined that instruction is a transactional instruction, proceeding to decision diamond 310 it is determined whether the instruction is a hardware transactional instruction, and if so, continuing to block 312 the HTM is emulated with respect to replay of the instruction, which may enable identification of correctness and/or performance TM errors ("bugs").

If, at decision diamond 310, it is determined that the instruction is a software transactional instruction, continuing to block 314 STM may be used to replay the instruction and to identify bugs, e.g., one or more errors that may include correctness errors and/or performance errors associated with the instruction.

Advancing to decision diamond 316, if a conflict associated with the instruction is detected by a post transaction instruction handler, moving to block 318, the instruction (whether transactional or non-transactional instruction) is sent to a hybrid transactional contention manager to resolve the conflict and advancing to decision diamond 320 it is determined whether all instructions in a current chunk have been replayed. If additional instructions in the current chunk have not been replayed, returning to block 302 the replayer engine replays the next instruction of the program. If all instructions of the current chunk have been replayed, the method ends at 320.

If no conflict is detected by the post-transaction instruction handler at decision diamond 316, advancing to decision diamond 320 if additional instructions in the current chunk have not been replayed, returning to block 302 the replayer engine replays the next instruction of the program. If all instructions of the current chunk have been replayed, the method ends at 320.

Figure 4:
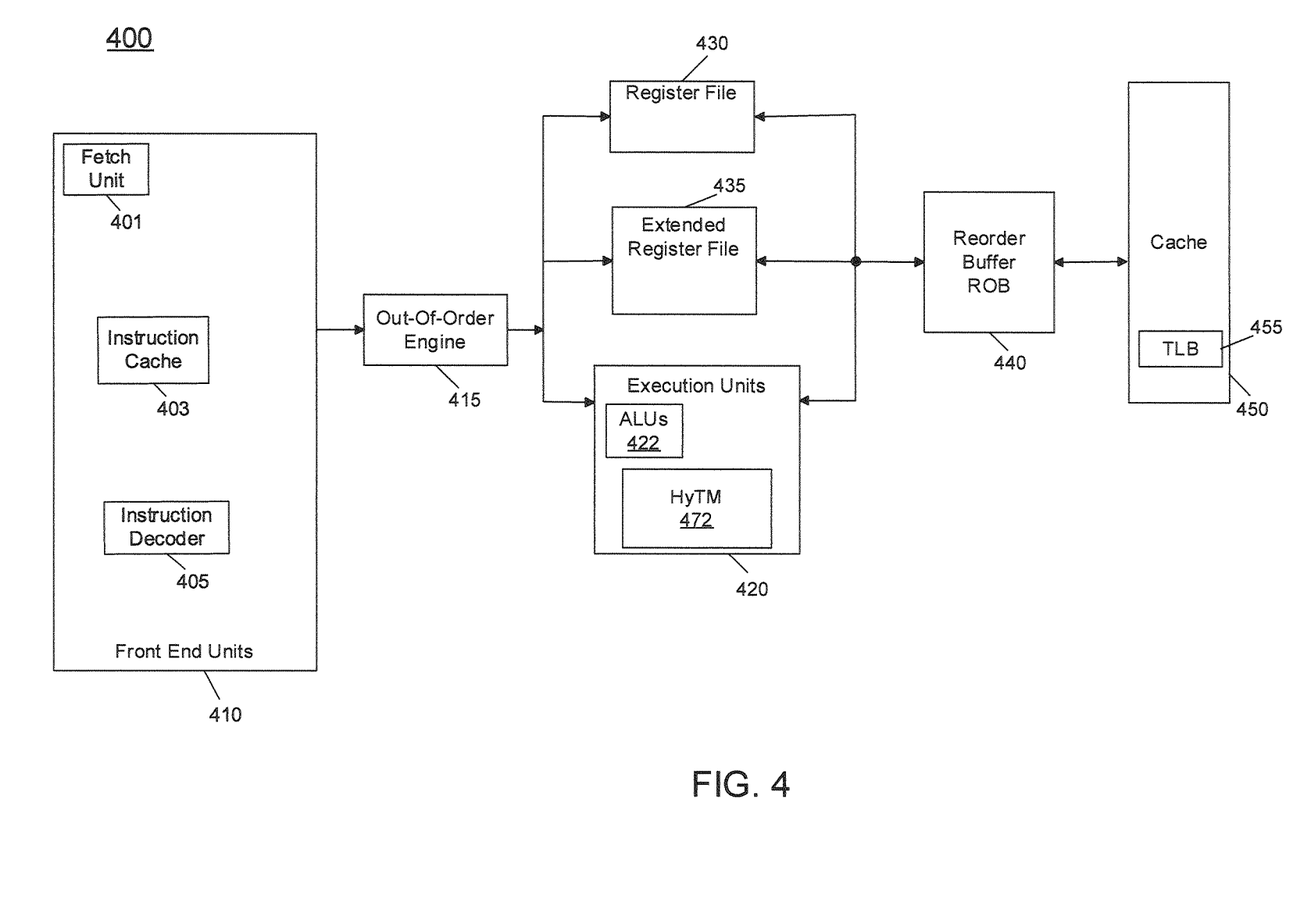
FIG. 4 is a block diagram of a processor core in accordance with an embodiment of the present invention.

Embodiments can be implemented in many different processor types. For example, embodiments can be realized in a processor such as a multicore processor. Referring now to FIG. 4, shown is a block diagram of a processor core in accordance with one embodiment of the present invention. As shown in FIG. 4, processor core 400 may be a multi-stage pipelined out-of-order processor.

As shown in FIG. 4, core 400 includes front end units 410, which may be used to fetch instructions to be executed and prepare them for use later in the processor. For example, front end units 410 may include a fetch unit 401, an instruction cache 403, and an instruction decoder 405. In some implementations, front end units 410 may further include a trace cache, along with microcode storage as well as instruction storage. Fetch unit 401 may fetch macro-instructions, e.g., from memory (not shown) or from instruction cache 403, and feed them to instruction decoder 405 to decode the macro-instructions into primitives such as instructions for execution by the processor.

Coupled between front end units 410 and execution units 420 is an out-of-order (OOO) engine 415 that may be used to receive the instructions and prepare them for execution. More specifically OOO engine 415 may include various buffers to reorder instruction flow and allocate various resources needed for execution, as well as to provide renaming of logical registers onto storage locations within various register files such as register file 430 and extended register file 435. Register file 430 may include separate register files for integer and floating point operations. Extended register file 435 may provide storage for vector-sized units, e.g., 256 or 512 bits per register.

Various resources may be present in execution units 420, including, for example, various integer, floating point, and single instruction multiple data (SIMD) logic units, among other specialized hardware. For example, such execution units may include one or more arithmetic logic units (ALUs) 422. The execution units 420 may include a hybrid transactional memory (HyTM) 472 to execute and record a program in an HTM portion of the HyTM 472. The HyTM 472 may include a replayer/transactional debugger configured to execute a replay and error detection of the program (or a chunk of code) using software (e.g., STM) of the HyTM 472 and and/or software emulation of a hardware transactional memory HTM portion of the HyTM 472, according to embodiments of the present invention.

When operations are performed on data within the execution units, results may be provided to retirement logic, namely a reorder buffer (ROB) 440. More specifically, ROB 440 may include various arrays and logic to receive information associated with instructions that are executed. This information is then examined by ROB 440 to determine whether the instructions can be validly retired and result data committed to the architectural state of the processor, or whether one or more exceptions occurred that prevent a proper retirement of the instructions. In embodiments of the present invention, ROB 440 may include a hybrid transactional contention manager (not shown) to resolve conflicts detected by the replayer of HyTM 472, according to embodiments of the present invention. Additionally, ROB 440 may handle other operations associated with retirement.

As shown in FIG. 4, ROB 440 is coupled to cache 450 which, in one embodiment may be a low level cache (e.g., an L1 cache) and which may also include translation lookaside buffer (TLB) 455, although the scope of the present invention is not limited in this regard. From cache 450, data communication may occur with higher level caches, system memory and so forth.

Note that while the implementation of the processor of FIG. 4 is with regard to an out-of-order machine such as a so-called x86 ISA architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry. Furthermore, other embodiments may be implemented in a graphics processor.

Figure 5:
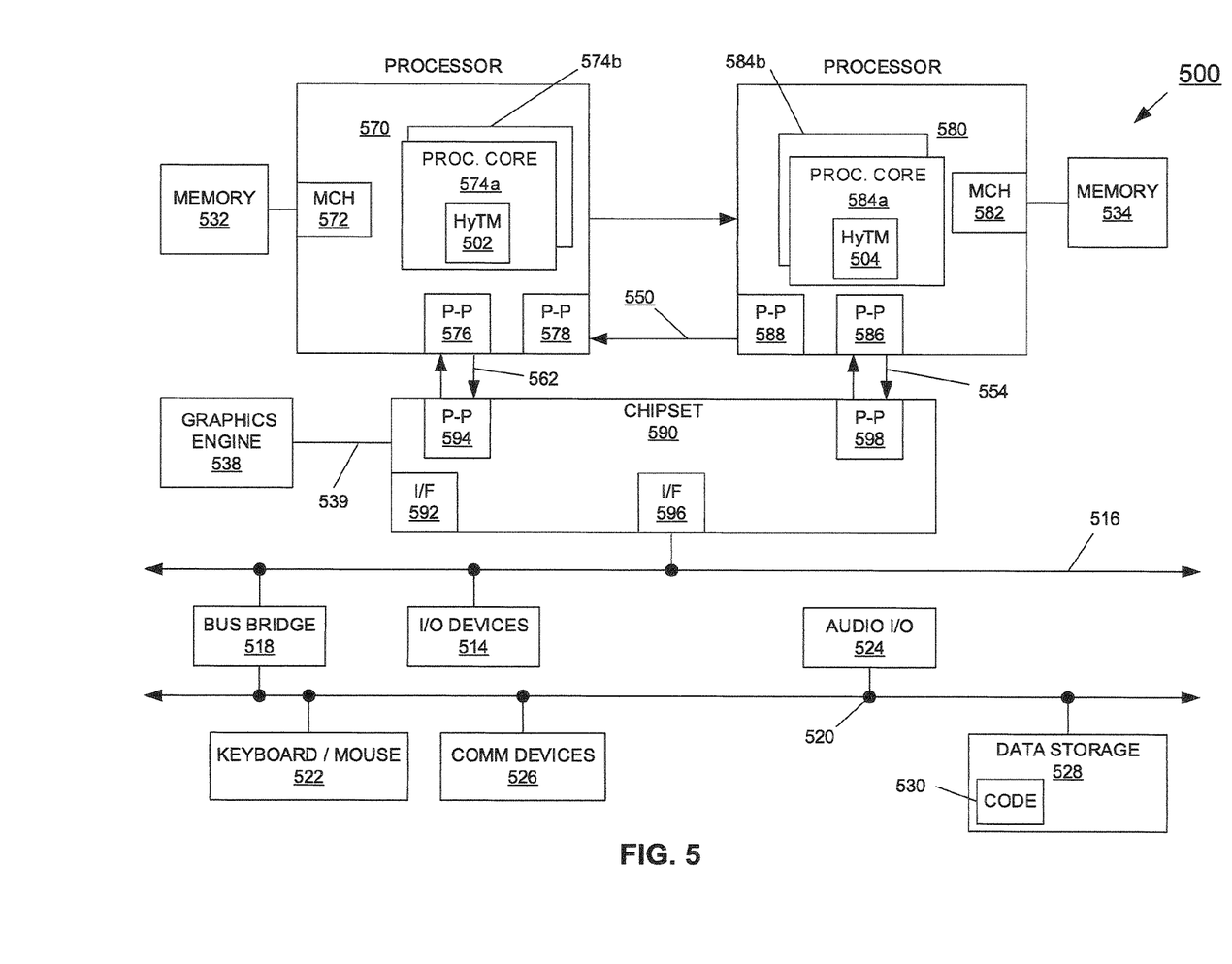
FIG. 5 is a block diagram of a system in accordance with an embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. (In other embodiments not shown, the processors may be connected via star topology, mesh topology, cross-bar topology, or by another connection scheme). As shown in FIG. 5, each of processors 570 and 580 may be multicore processors, including first and second processor cores (e.g., processor cores 574a and 574b, and processor cores 584a and 584b), although potentially many more cores may be present in the processors.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCHs 572 and 582 couple the processors to respective memories, namely a memory 532 and a memory 534, which may be portions of system memory (e.g., DRAM) locally attached to respective processors. First processor 570 and second processor 580 may be coupled to a chipset 590 via P-P interconnects 562 and 554, respectively. As shown in FIG. 5, chipset 590 includes P-P interfaces 594 and 598. Furthermore, chipset 590 includes an interface 592 to couple chipset 590 with a graphics engine 538 by a P-P interconnect 539.

Each of processor cores 574a and 584a may include a hybrid transactional memory (HyTM) 502 and 504 respectively, according to embodiments of the present invention. Each HyTM (502, 504) may execute and record a corresponding program in an HTM portion of the HyTM. Each HyTM (502, 504) may include a replayer/transactional debugger configured to execute a replay and error detection of the corresponding program (or a chunk of code) using software of the corresponding HyTM and and/or software emulation of a hardware transactional memory (HTM) portion of the corresponding HyTM, according to embodiments of the present invention.

Chipset 590 may be coupled to a first bus 516 via an interface 596. As shown in FIG. 5, various input/output (I/O) devices 514 may be coupled to the first bus 516, along with a bus bridge 518, which couples first bus 516 to a second bus 520. Various devices may be coupled to the second bus 520 including, for example, a keyboard/mouse 522, communication devices 526, and a data storage unit 528 such as a disk drive or other mass storage device that may store code 530, in one embodiment. Further, an audio I/O 524 may be coupled to second bus 520. Embodiments can be incorporated into other types of systems including mobile devices such as a smart cellular telephone, tablet computer, netbook, Ultrabook™, notebook, desktop computer, or so forth.

Other embodiments are described below.

In one example, a system includes a processor including a hybrid transactional memory (HyTM) that includes hardware transactional memory (HTM). The processor also includes a program debugger to replay a program that includes a hardware transactional memory (HTM) instruction and that has been executed using the HyTM. The program debugger includes a software emulator to replay the HTM instruction by emulation of the HTM. The system also includes a dynamic random access memory (DRAM) to store the program.

In an example, the program debugger is further to replay a software transactional instruction of the program through use of a software transactional memory (STM).

In an example, the program debugger is to replay a non-transactional instruction of the program with strong software transactional memory (STM) isolation.

In an example, the program debugger is to identify at least one of correctness errors and performance errors in the program.

In another example, at least one computer readable storage medium has instructions stored thereon for causing a system to replay a program that has been executed by a hybrid transactional memory (HyTM) system that includes hardware transactional memory (HTM). The replay is performed at least in part through software emulation of the HTM.

In an example, the HyTM system also includes software transactional memory (STM). In an example, when a program instruction to be replayed is a transactional instruction that is associated with a software transaction, the replay is executed using the STM.

In an example, the at least one computer readable storage medium further includes instructions to identify one or more conflicts in the program via the replay of the program including instructions to identify at least one of correctness errors and performance errors.

In an example, the replay exactly emulates a recording of execution of the program performed by the HyTM.

In an example, the instructions to replay the program include instructions to determine whether a program instruction of the program is a transactional instruction or a non-transactional instruction. When the program instruction is a non-transactional instruction replay is performed with strong software transactional memory (STM) isolation.

In an example, when a program instruction to be replayed is a transactional instruction that is associated with a hardware transaction, replay is performed by the software emulation of the HTM.

In an example, the stored instructions cause the system to replay the program without perturbation of the program.

In an example, the at least one computer readable storage medium further includes instructions to cause the system to capture at least one of a location and a cause of a transactional abort.

In an example, replay of the program includes at least one context switch that causes a stall of execution of a first thread and a resumption of execution of a second thread, and the replay is performed using the software emulation of the HTM.

In an example, the at least one computer readable storage medium further stores instructions to emulate, via software emulation, an abort decision-making portion of a transactional memory contention manager of the HTM.

In another example, a method includes replaying a program that has been executed in a hybrid transactional memory (HyTM) system that includes hardware transactional memory (HTM), where the replaying is performed at least in part using a software emulation of the HTM. The method also includes identifying one or more conflicts in the program via replaying the program.

In an example, the method includes emulating via software emulation, an abort decision-making portion of a transactional memory contention manager of the HTM.

In an example, the HyTM includes software transactional memory (STM), the method further comprising utilizing the STM to replay one or more software transactional instructions of the program.

In an example, replay of a non-transactional instruction of the program is performed with strong software transactional memory (STM) isolation.

In an example, the method includes capturing at least one of a location and a cause of a transactional abort associated with the program.

In an example, an apparatus may perform any of the above-described methods.

In an example, machine-readable storage including machine-readable instructions, when executed, may implement any of the above-described methods.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
recording, via a hardware recording logic, a program that has been executed in a hybrid transactional memory (HyTM) system that includes hardware transactional memory (HTM) and software transactional memory (STM);
replaying the recorded program, via a debugger that includes a replayer engine to replay instructions of the program, including providing one or more replayed instructions for non-transactional execution if the one or more replayed instructions are non-transactional instructions and providing one or more other replayed instructions for transactional execution, including providing a HTM instruction to a software emulator to replay the HTM instruction by emulation of the HTM and providing a STM instruction for replay through use of the STM;
identifying one or more conflicts in the program via replaying the program including analyzing the one or more conflicts in the one or more replayed instructions in a post transaction instruction handler; and
resolving the one or more conflicts in a HyTM contention manager, the HyTM contention manager to emulate a second HyTM contention manager used in the TM program recording.

2. The method of claim 1, further comprising emulating via software emulation, an abort decision-making portion of a transactional memory contention manager of the HTM.

3. The method of claim 1, wherein replay of a non-transactional instruction of the program is performed with strong software transactional memory (STM) isolation.

4. The method of claim 1, further comprising capturing at least one of a location of a transactional abort and a cause of the transactional abort associated with the program.

5. The method of claim 1, further comprising ordering, via the hardware recording logic, interleaved shared memory accesses by a software transaction and a non-transactional memory access.

6. The method of claim 5, further comprising using the shared memory interleaving ordered by the hardware recording logic to identify a correctness bug between a memory access within the software transaction and the non-transactional memory access.

7. A system comprising:
a processor including:
a hybrid transactional memory (HyTM) that includes hardware transactional memory (HTM) and software transactional memory (STM) to execute a transactional memory (TM) program and record the TM program via a hardware recording logic, the hardware recording logic to order interleaved shared memory accesses; and
a program debugger to replay the recorded TM program, the program debugger including a replayer engine to replay instructions of the TM program, and provide one or more replayed instructions for non-transactional execution if the one or more replayed instructions are non-transactional instructions and provide one or more other replayed instructions for transactional execution, including to provide a HTM instruction to a software emulator to replay the HTM instruction by emulation of the HTM and to provide a STM instruction for replay through use of the STM, the program debugger further including a post transaction instruction handler to analyze conflicts in the one or more replayed instructions and a HyTM contention manager to resolve the conflicts, the HyTM contention manager to emulate a second HyTM contention manager used in the TM program recording; and
a dynamic random access memory (DRAM) to store the TM program.

8. The system of claim 7, wherein the program debugger is further to replay the non-transactional instruction of the TM program with strong software transactional memory (STM) isolation.

9. The system of claim 7, wherein the program debugger is to identify performance errors in the TM program.

10. The system of claim 7, wherein the program debugger is to use the shared memory interleaving to identify a correctness bug between a memory access within a software transaction and a non-transactional memory access.

11. The system of claim 7, wherein the program debugger is, after the replay of the HTM instruction or the STM instruction, to provide the replayed HTM instruction or the replayed STM instruction to the post transaction instruction handler to determine whether a conflict is associated with the replayed HTM instruction or the replayed STM instruction.

12. At least one non-transitory computer readable storage medium having instructions stored thereon for causing a system to:
record, via a hardware recording logic, a program that has been executed by a hybrid transactional memory (HyTM) that includes hardware transactional memory (HTM) and software transactional memory (STM); and
replay the recorded program via a debugger that includes a replayer engine to replay instructions of the program, and to provide one or more replayed instructions for non-transactional execution if the one or more replayed instructions are non-transactional instructions and provide one or more other replayed instructions for transactional execution, including to provide a HTM instruction to a software emulator to replay the HTM instruction by emulation of the HTM and to provide a STM instruction for replay through use of the STM, analyze conflicts in the one or more replayed instructions in a post transaction instruction handler, and resolve the conflicts in a HyTM contention manager, the HyTM contention manager to emulate a second HyTM contention manager used in the TM program recording, wherein the debugger is to use shared memory interleaving ordered by the hardware recording logic to identify a correctness bug between a memory access within a software transaction and a non-transactional memory access.

13. The at least one non-transitory computer readable storage medium of claim 12, further including instructions to identify one or more conflicts in the program via the replay of the program including instructions to identify correctness errors.

14. The at least one non-transitory computer readable storage medium of claim 12, wherein the replay exactly emulates a recording of execution of the program performed by the HyTM.

15. The at least one non-transitory computer readable storage medium of claim 12, wherein the instructions to replay the program include instructions to determine whether a program instruction of the program is a transactional instruction or a non-transactional instruction, wherein when the program instruction is a non-transactional instruction replay is performed with strong software transactional memory (STM) isolation.

16. The at least one non-transitory computer readable storage medium of claim 12, wherein the stored instructions cause the system to replay the program without perturbation of the program.

17. The at least one non-transitory one computer readable storage medium of claim 12, further including instructions to cause the system to capture at least one of a location of a transactional abort and a cause of the transactional abort.

18. The at least one non-transitory computer readable storage medium of claim 12, wherein replay of the program includes at least one context switch that causes a stall of execution of a first thread and a resumption of execution of a second thread, and wherein the replay is performed using the software emulation of the HTM.

19. The at least one non-transitory computer readable storage medium of claim 12, further storing instructions to emulate, via software emulation, an abort decision-making portion of a transactional memory contention manager of the HTM.

\* \* \* \* \*